US012527435B2

(12) United States Patent
Lyu (10) Patent No.: US 12,527,435 B2
(45) Date of Patent: Jan. 20, 2026

(54) HANDHELD FOOD CUTTER

(71) Applicant: AvoBagel Company Limited, Hong Kong (HK)

(72) Inventor: Wen Hua Lyu, Jiangmen (CN)

(73) Assignee: AvoBagel Company Limited, Hong Kong (HK)

( * ) Notice: Subject to any disclaimer, the term of this patent is extended or adjusted under 35 U.S.C. 154(b) by 337 days.

(21) Appl. No.: 18/495,718

(22) Filed: Oct. 26, 2023

(65) Prior Publication Data

US 2025/0134313 A1 May 1, 2025

(51) Int. Cl.
*A47J 43/044* (2006.01)
*A47J 43/07* (2006.01)
*A47J 43/08* (2006.01)

(52) U.S. Cl.
CPC ......... *A47J 43/044* (2013.01); *A47J 43/0711* (2013.01); *A47J 43/082* (2013.01); *A47J 2043/04427* (2013.01)

(58) Field of Classification Search
CPC .. A47J 42/04; A47J 42/14; A47J 42/24; A47J 42/34; A47J 43/044; A47J 43/082; A47J 43/1006; A47J 43/1031; A47J 43/1075; A47J 2043/04409
See application file for complete search history.

(56) References Cited

U.S. PATENT DOCUMENTS

| | | | | |
|---|---|---|---|---|
| 2,169,607 | A | * 8/1939 | Kelley | A47J 43/105 366/343 |
| 4,763,567 | A | * 8/1988 | Dalquist, III | A47J 43/105 99/348 |
| 2007/0180727 | A1 | * 8/2007 | Wan | A47J 43/1018 34/58 |
| 2007/0221770 | A1 | * 9/2007 | Cheng | A47J 42/04 241/169.1 |
| 2008/0210103 | A1 | * 9/2008 | Wan | A47J 43/24 99/495 |
| 2009/0045274 | A1 | * 2/2009 | So | A47J 43/082 241/169.1 |
| 2013/0015279 | A1 | * 1/2013 | So | A47J 42/04 241/169.1 |

(Continued)

FOREIGN PATENT DOCUMENTS

| | | | | | |
|---|---|---|---|---|---|
| CH | | 225319 A | * 1/1943 | | A47J 42/34 |
| CN | | 107468096 A | * 12/2017 | | A47J 43/082 |

(Continued)

*Primary Examiner* — Jared O Brown
(74) *Attorney, Agent, or Firm* — Melvin Li (57) ABSTRACT

A food cutter is disclosed. The food cutter has an elongate body defining a longitudinal axis and has an upper portion and a lower portion. The food cutter elongate body has a cylindrical profile with a closed bottom and a top end of the upper portion has a hemispherical profile, wherein the elongate body has a height of 8.8-16.5 cm and a width or diameter of 5.9-12.5 cm. The upper portion includes a housing, a handle extended from the housing, a drive shaft, wherein the housing contains a gear mechanism transferring a driving force from the handle to the drive shaft. The lower portion assumes the profile of a container for accommodating food items to be processed, wherein the lower portion is provided an opening to which the upper portion is removably engaged to close the opening during use.

20 Claims, 10 Drawing Sheets

(56) References Cited

U.S. PATENT DOCUMENTS

| | | | |
|---|---|---|---|
| 2014/0116164 A1* | 5/2014 | Harris | A47J 43/082 74/30 |
| 2014/0283692 A1* | 9/2014 | So | A47J 43/24 99/495 |
| 2015/0075392 A1* | 3/2015 | So | A47J 43/082 99/495 |
| 2023/0089788 A1* | 3/2023 | Benoit | A47J 43/044 241/62 |

FOREIGN PATENT DOCUMENTS

| | | | | |
|---|---|---|---|---|
| WO | WO-2022137230 A1 * | 6/2022 | | A47J 43/07 |
| WO | WO-2023187282 A1 * | 10/2023 | | A47J 43/082 |

* cited by examiner

HANDHELD FOOD CUTTER

TECHNICAL FIELD

The present invention is concerned with a culinary utensil and specifically a food cutter including but not limited to a non-electrically operated handheld food cutter.

BACKGROUND OF THE INVENTION

There are a variety of culinary tools to aid the preparation of food or culinary purposes. Common conventional appliances include electric food processors. Such food processors are versatile and powerful and they are adapted to provide different food processing functions. However, they are typically relatively bulky and include many different components. As such, after each use, it is a tremendous effort to clean up and stow away. On the other hand, some food processors are too small to accommodate larger food items, or they are too complicated in construction which makes cleaning a nightmare.

Due to at least these reasons, handheld or non-electric tools which are relatively compact are still desirable. Users who have a small kitchen or prepare a relatively simple meal would still prefer such culinary tools.

During food preparation, one typical exercise is cutting of food items into small pieces. Using a conventional knife is an option, but inexperienced users would find it awkward, tedious, dangerous and/or time consuming to use a knife to cut a food item into small pieces.

The present invention seeks to address the above problems, or to provide a more effective food cutter with a simpler construction and/or easy-to-clean construction, or at least to provide an alternative to the public.

SUMMARY OF THE INVENTION

According to a first aspect of the present invention, there is provided a food cutter with an elongate body defining a longitudinal axis, comprising an upper portion and a lower portion, wherein i) the upper portion includes a housing, a handle extended from the housing, a drive shaft, wherein the housing contains a gear mechanism transferring a driving force from the handle to the drive shaft, ii) the lower portion includes a container for accommodating food items to be processed, wherein the lower portion is provided an upper rim defining an opening to which the upper portion removably engages to close the opening during use, iii) the handle is provided with a pair of arms extending from the upper portion and joining to form a lever at a distal end thereof, wherein in use the lever of the handle is reciprocatingly movable between a clockwise (or upward) direction and an anti-clockwise (downward) direction, iv) the gear mechanism has a first gear wheel, vertically disposed, with respect to the longitudinal axis and defining a first wheel surface and a second wheel surface opposite to the first wheel surface, v) the first wheel surface is provided with teeth on its rim, vi) the gear mechanism has a second gear wheel, horizontally disposed, with respect to the longitudinal axis and defining a first, upwardly facing, wheel surface provided with teeth at which the teeth of the first gear wheel engage, and a second, downwardly facing, wheel surface defining an inner rim and provided with teeth, vi) the drive shaft has an elongate profile and is vertically disposed and defines an upper end engaged with the teeth of the inner rim of the second wheel surface, and viii) the drive shaft is provided with a distal end for driving a plurality of rotatable blades disposed in the lower portion, whereby clockwise or upward movement of the lever of the handle effects rotation of the blades in one direction and anti-clockwise or downward movement of the lever of the handle effects rotation of the plurality of blades in the opposite direction.

Preferably, the first gear wheel may be the only vertically disposed gear wheel in the gear mechanism; the elongate body may have a cylindrical profile with a closed bottom and a top end of the upper portion has a hemispherical profile; and the distal end of the drive shaft may protrude form the upper portion of the food cutter. For sake of clarity, providing only one vertically disposed gear wheel refers to providing only one functional vertically disposed gear wheel operably engaged in the gear mechanism.

Suitably, the elongate body may have a height of 8.8-16.5 cm and a width or diameter of 5.9-12.5 cm. These dimension ranges are not arbitrary but are advantageous in the context of the present invention.

In an embodiment, the pair of arms extended from opposite sides of the upper portion of the food cutter may define a laterally extending axis passing through the center of the first gear wheel, and wherein the laterally extending axis may be disposed perpendicularly to the longitudinal axis of the elongate body. In a more specific embodiment, the pair of arms extended from the upper portion may wrap around and conform to shape of the hemispherical upper portion of the elongate body and transitioned into the lever.

In one embodiment, the lever may be reciprocatingly movable or swingable from one lateral side of the upper portion of the food cutter to an opposite lateral side of the upper portion of the food cutter.

Advantageously, the first gear wheel may be provided with a column fitted to or formed in the center thereof and the pair of arms may be fixedly secured to the column whereby movement of the handle and thus the arms rotate the column and thus the first gear wheel.

Preferably, the second wheel surface of the first gear wheel may be free of teeth, or at least may be free of functional or operable teeth.

Suitably, the second gear wheel may be disposed within the upper portion of the food cutter in an off-centered configuration and positioned such that the teeth from the first wheel surface of the first gear wheel engages the teeth of an upper surface of the second gear wheel.

In a preferred embodiment, the elongate body and the drive shaft share the longitudinal axis. In one embodiment, an upper end of the drive shaft may be provided with teeth geared to the teeth of the inner rim of the second gear wheel whereby rotational movement of the second gear wheel in turn rotates the drive shaft.

The lower portion of the food cutter may include a blade assembly having an axle from which the plurality of blades radially extends. In a specific embodiment, a lower end of the drive shaft may engage with an upper end of the axle whereby rotation of the drive shaft rotates the plurality of blades.

In some embodiments, the plurality of blades may include two or three blade members.

In one embodiment, the blade assembly may include a first plate positioned adjacent to or abutting a bottom the upper portion of the food cutter and a second plate positioned to or abutting the lower portion of the food cutter for dislodging food items adhered to the bottom surface of the upper portion and the floor surface of the lower portion of the food cutter and then for processing by the plurality of blades.

According to a second aspect of the present invention, there is provided a food cutter with an elongate body defining a longitudinal axis, comprising an upper portion and a lower portion, wherein i) the elongate body has a cylindrical profile with a closed bottom and a top end of the upper portion has a hemispherical profile, wherein the elongate body has a height of 8.8-16.5 cm and a width or diameter of 5.9-12.5 cm, ii) the upper portion includes a housing, a handle extended from the housing, a drive shaft, wherein the housing contains a gear mechanism transferring a driving force from the handle to the drive shaft, iii) the lower portion assumes the profile of a container for accommodating food items to be processed, wherein the lower portion is provided an opening to which the upper portion is removably engaged to close the opening during use, iv) the handle extends from the elongate body and in use is reciprocatingly movable in a clockwise (or upward) direction and in an anti-clockwise (downward) direction, and v) the drive shaft is provided with a lower end protruding from the upper portion for driving a plurality of rotatable blades disposed in the lower portion of the food cutter, whereby clockwise or upward movement of the lever of the handle effects rotation of the blades in one direction and anti-clockwise or downward movement of the lever of the handle effects rotation of the blades in the opposite direction. These dimensions are advantageous in the context of the present invention of a handheld, non=electric, food cutter.

Preferably, the gear mechanism may have a first gear wheel, with respect to the longitudinal axis, vertically disposed, defining a first wheel surface; the first gear wheel may define a second wheel surface opposite to the first wheel surface; the first gear wheel may be the only vertically disposed gear wheel in the gear mechanism; the first wheel surface may be provided with teeth on its rim; the gear mechanism may have a second gear wheel, horizontally disposed, with respect to the longitudinal axis, and defining an upwardly facing, wheel surface provided with teeth at which the teeth of the first gear wheel engage, and a downwardly facing wheel surface defining an inner rim and provided with teeth; the drive shaft may have an elongate profile and is vertically disposed and defines an upper end engaged with the teeth of the inner rim of the second wheel surface; and the first gear wheel may be the only vertically disposed gear wheel in the gear mechanism.

Suitably, the handle may be provided with a pair of arms extending from opposite sides of the upper portion and joining to form a lever at a distal end, and wherein in use the lever of the handle may be reciprocatingly movable in the clockwise (or upward) direction and in the anti-clockwise (downward) direction.

The second wheel surface of the first gear wheel may be free of teeth or least functional teeth operable engaged in the gear mechanism.

In an embodiment, the food cutter may comprise blade assembly resided in the lower portion and may include a first plate disposed adjacent to a bottom surface of the upper portion and a second plate disposed adjacent to a floor surface of the lower portion for dislodging food items adhered to the bottom surface of the upper portion and the floor surface of lower portion.

BRIEF DESCRIPTION OF DRAWINGS

Some embodiments of the present invention will now be explained, with reference to the accompanied drawings, in which:

FIG. 10a is a schematic diagram showing exemplary processing of food items by the food cuter of FIG. 1; and FIG. 10b is perspective view of a lower portion of the food cutter of FIG. 10a.

DETAILED DESCRIPTION OF PREFERRED EMBODIMENTS OF THE INVENTION

The present invention is concerned with a food processor, or a handheld, non-electrically operated food cutter, for cutting food items such as garlic, ginger, etc. into small pieces. The food cutter is illustrated and explained by way of examples below.

Figures 1, 2:
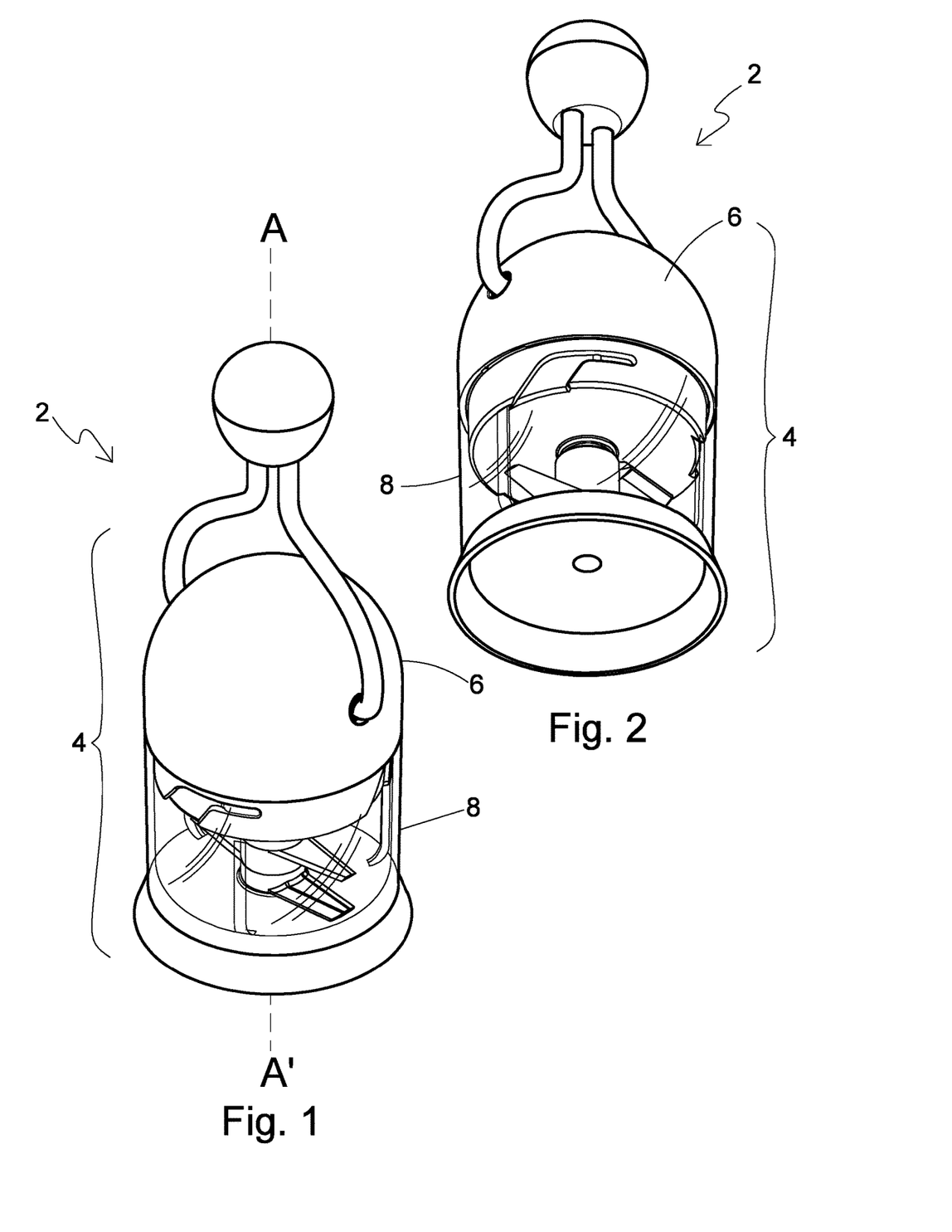
FIG. 1 is top perspective view of an embodiment of a food cutter according to the present invention.
FIG. 2 is bottom perspective view of the food cutter of FIG. 1.

FIGS. 1-2 are top and bottom perspective views of an embodiment of a food cutter generally designated 2. The food cutter 2 has an elongate (or upstanding) body 4 defining a longitudinal axis A-A'. The food cutter 2 generally comprises an upper portion 6 and a lower portion 8. In this embodiment, the height and the width or diameter of the elongate body 4 of the food cutter 2 are 10.4 cm and 6.9 cm, respectively. In another embodiment with a smaller size, the height and the width or diameter of the elongate body of the food cutter are 8.8 cm and 5.9 cm, respectively. In yet another embodiment with a larger size, the height and the width or diameter of the elongate body of the food cutter are 16.5 cm and 12.5 cm, respectively.

Figure 3:
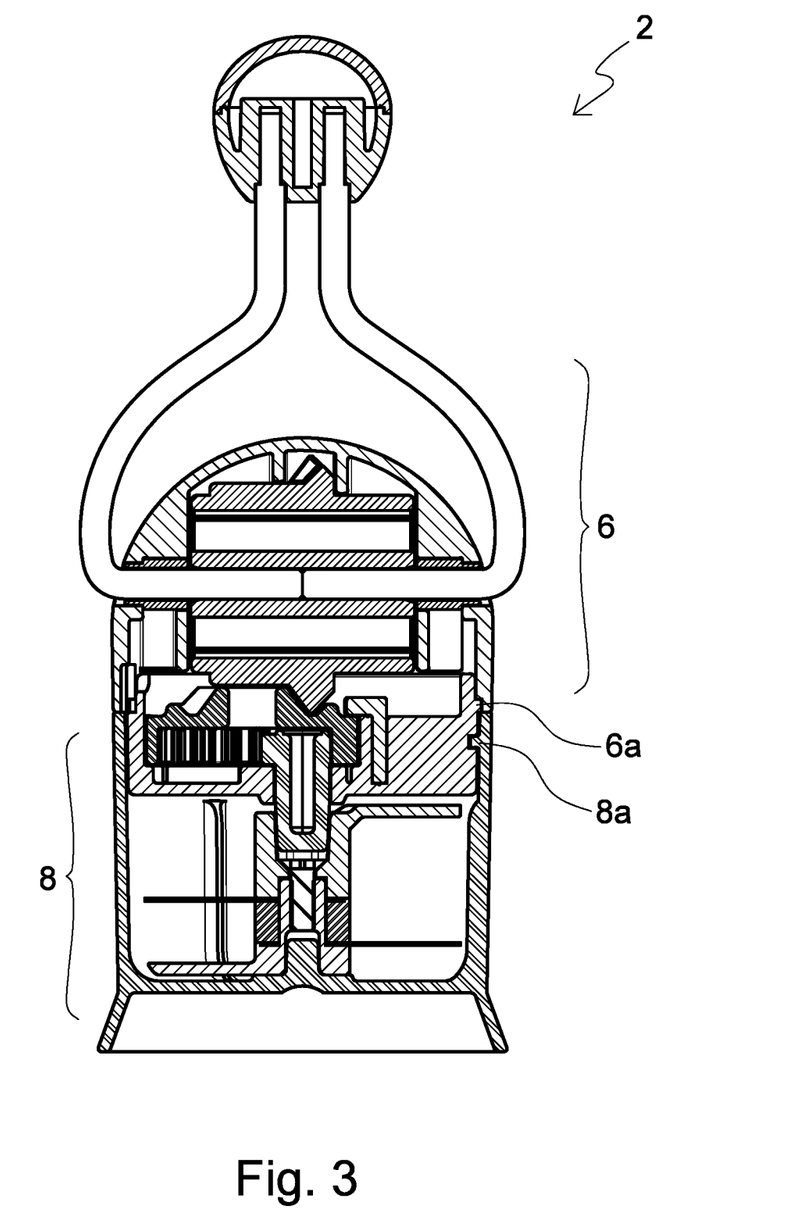
FIG. 3 is a schematic diagram of the food cutter of FIG. 1 showing internal structure thereof.
Figure 8:
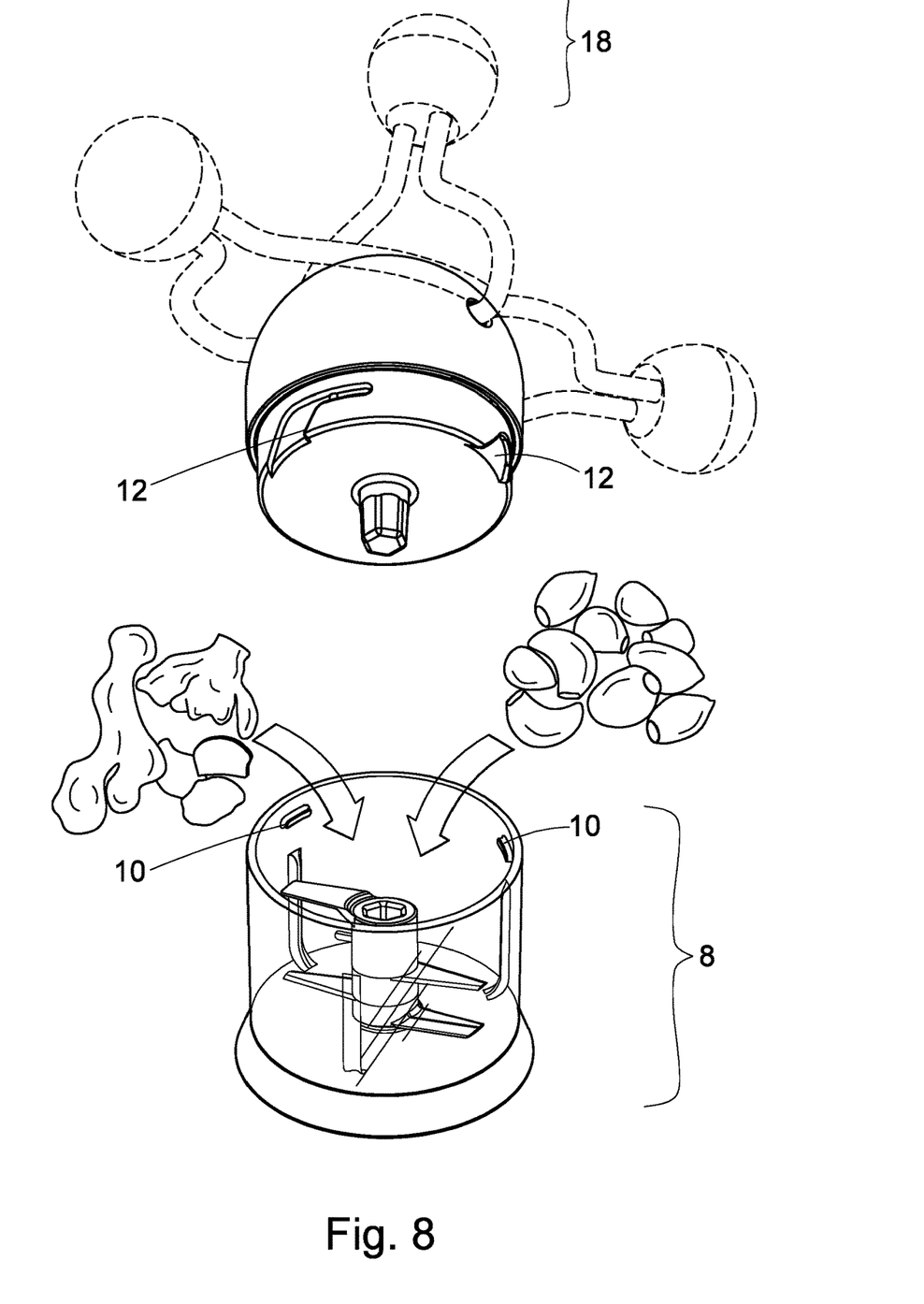
FIG. 8 is a schematic diagram showing an exemplary processing of food items by the food cuter of FIG. 1.
Figure 9A:
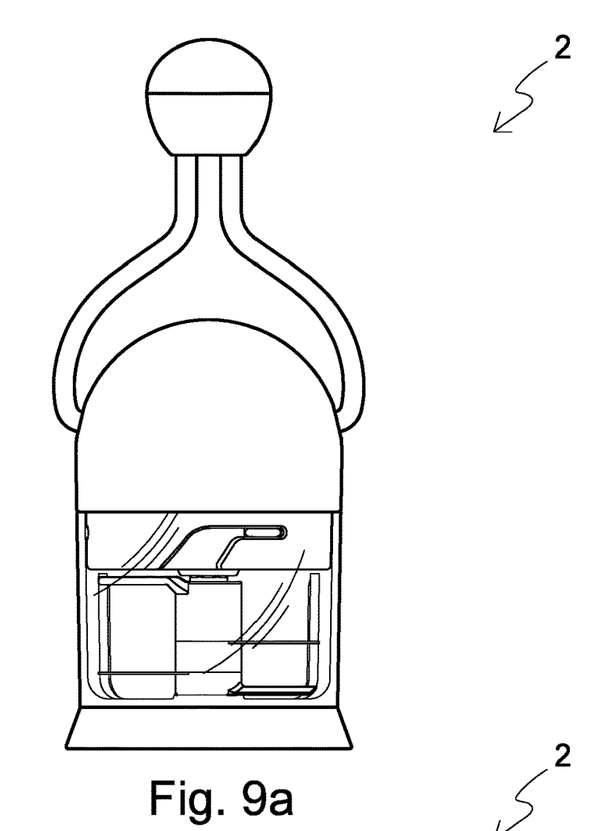
FIG. 9a is a side view of the food cutter of FIG. 1 disposed in a first configuration.
Figure 9B:
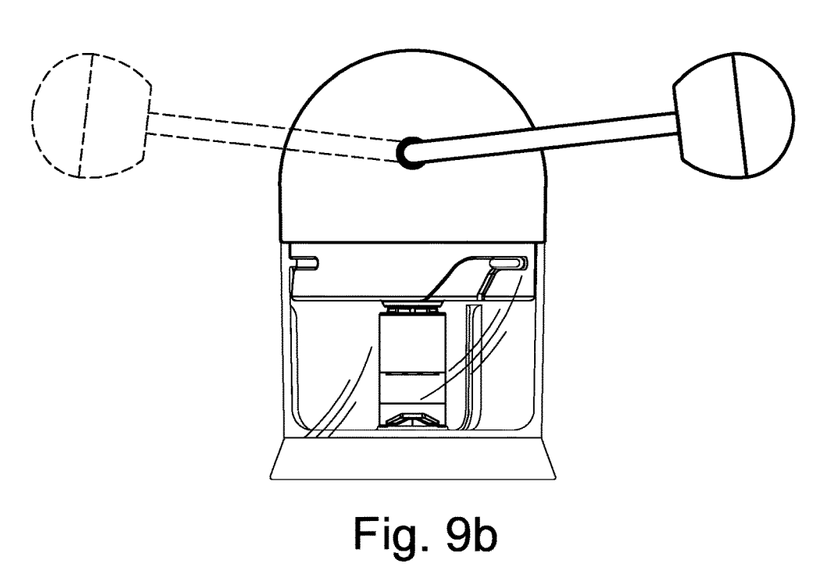
FIG. 9b is a schematic diagram showing two possible configurations of the food cutter of FIG. 1.
Figures 10A, 10B:
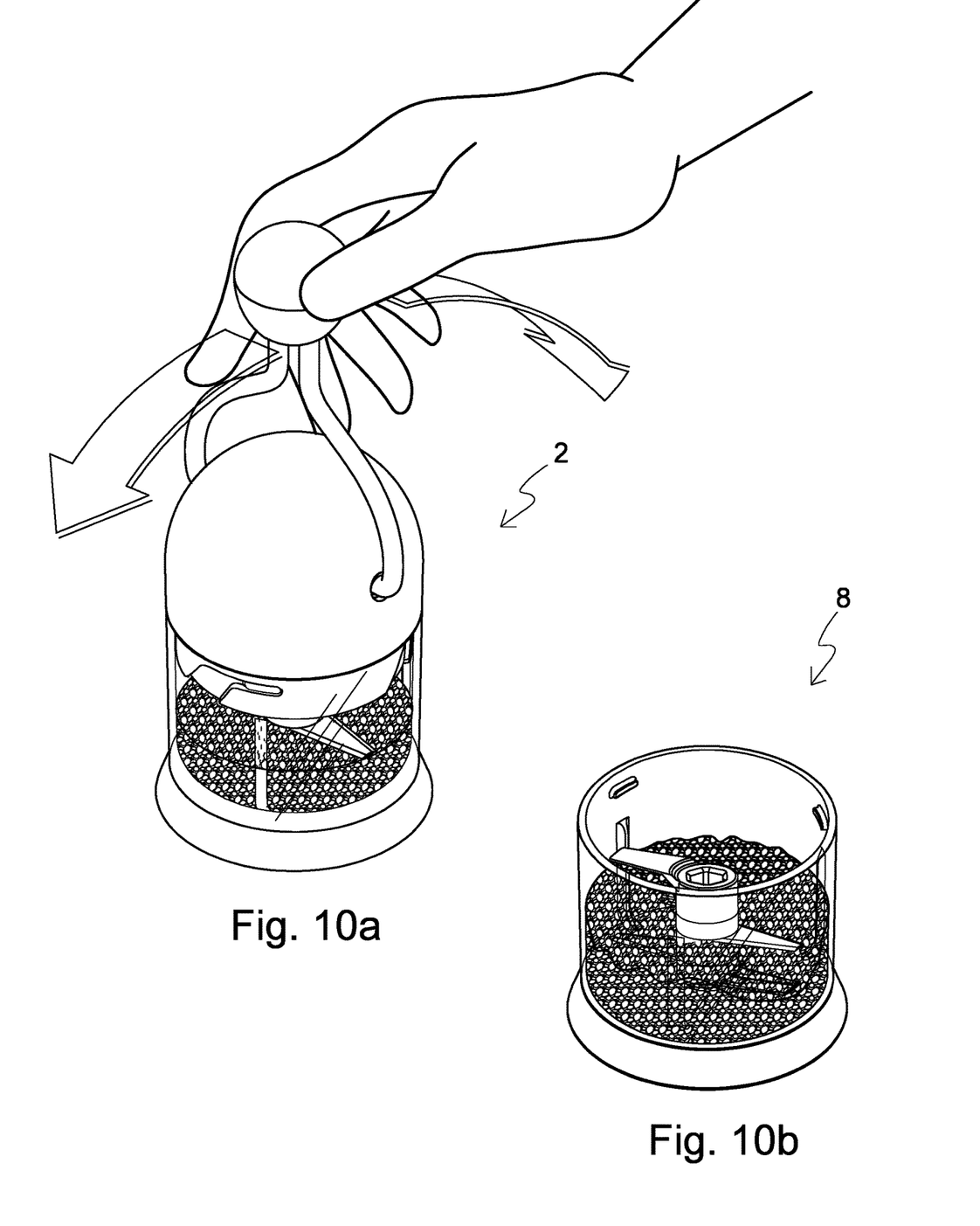

FIG. 3 is a schematic diagram of the food cutter of FIG. 1 showing an internal structure of the food cutter 2. It is shown that, in an assembled configuration, the upper portion 6 is removably connected to the lower portion 6, with a lower end 6a of the upper portion 6 engaged to an upper end 8a of the lower portion 8. In other words, the upper portion 6 sits on the lower portion 8 and seals the lower portion 8 at its upper rim. In this embodiment, the removable connection of the upper portion 6 and the lower portion 8 is achieved with lugs 10 provided on the upper end 8a of the lower portion 8 received in corresponding recesses 12 formed in the lower end 6a of the upper portion 6. Please also see FIG. 8. It can be seen from FIG. 8 that when assembled, the lower end 6a of the upper portion 6 sits within the upper end 8a of the upper portion 8. The removability of the upper portion from the lower portion allows a user to easily clean the food cutter, especially the lower portion after use.

Figure 4:
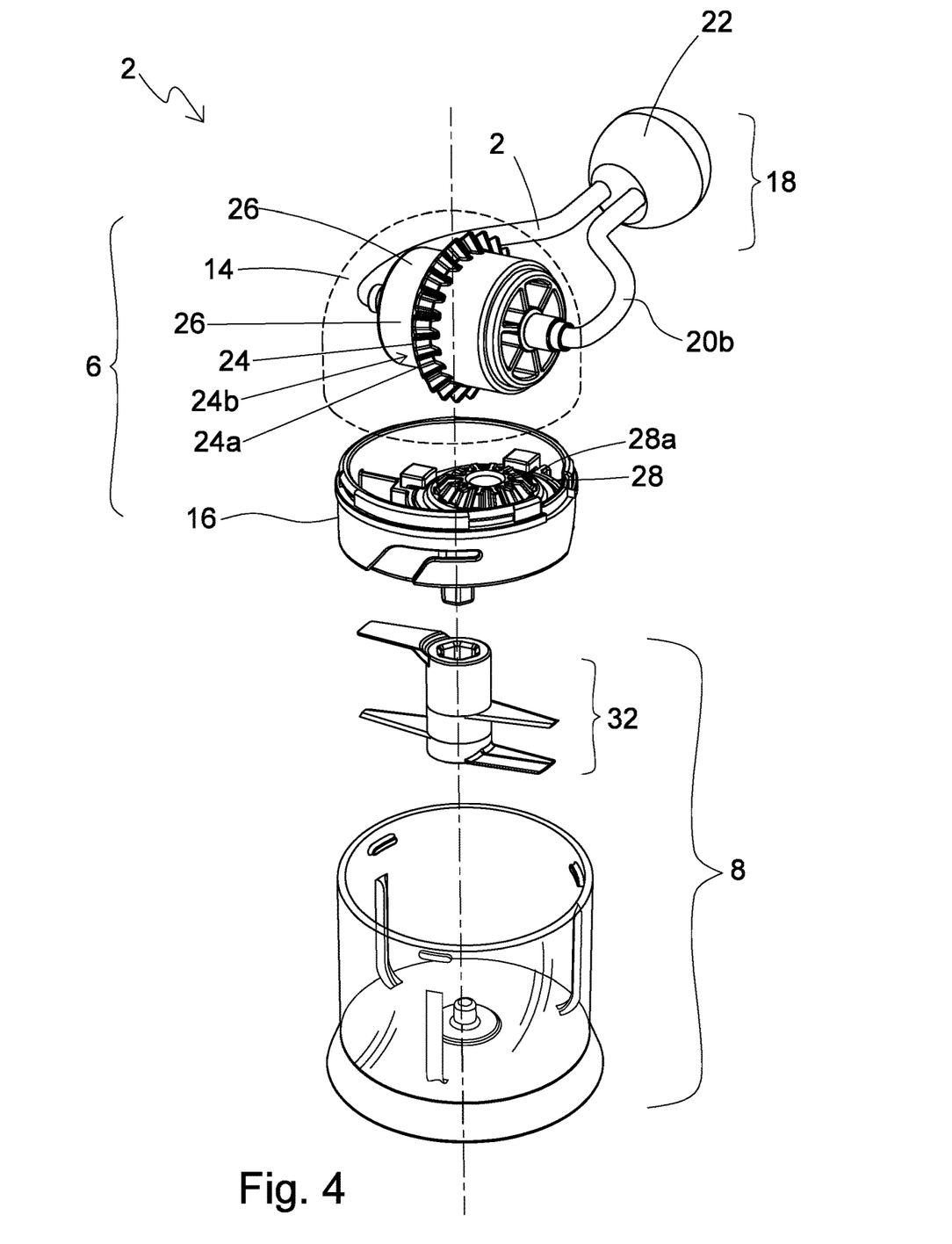
FIG. 4 is a first exploded view of the food cutter of FIG. 1.

FIG. 4 is a first exploded view of the food cutter 2. The upper portion 6 of the food cutter 2 includes a hemispherical part 14 and a cylindrical part 16 positioned below and depending from the hemispherical part 14. The food cutter 2 is provided with a handle 18 extending from the hemispherical part 14. In this embodiment, the handle 18 includes a pair of arms 20a, 20b extending transversely from opposite lateral sides of the hemispherical part 14 of the food cutter 2. The arms 20a, 20b conform to the shape of the hemispherical part 14 and transition to a lever. In this embodiment, the lever assumes the form of a knob 22. However, any suitable formation suitable for being gripped by the fingers and the palm of a user is appropriate. Specifically, the arms 20a, 20b are made of a metallic material while the lever or the knob 22 is made of a polymeric material. However, in other embodiments, the arms may be made of other materials. In this embodiment, the cylindrical part 16 is relatively thinner compared to the hemispherical part 14.

The hemispherical part 14 contains a first gear wheel 24. The first gear wheel 24 is relatively thin and defines opposite wheel surfaces, namely a first and a second, outwardly facing wheel surfaces 24a, 24b. In other words, the first gear wheel 24, with respect to the longitudinal axis of the elongate body 4, is vertically disposed. The hemispherical part 14 also contains a column 26 secured and fitted to and/or within the first gear wheel 24. The column 26 is substantially thicker and runs through the first gear wheel 24. The arms 20a, 20b are fixedly connected to opposite ends of the column 26. In other words, as the handle 18 and thus the arms 20a, 20b are caused to move around the hemispherical part 14, the column 26 and thus the first gear wheel 24 are rotated correspondingly. Referring specifically to FIG. 4, it can be understood that as the handle 18 and the arms 20a, 20b are caused to move in a clockwise direction or upwardly, the column 26 and thus the first gear wheel 24 are also rotated or moved in a corresponding direction. Alternatively, as the handle 18 and the arms 20a, 20b are caused to move in an anti-clockwise direction or downwardly, the column and thus the first gear wheel are caused to rotate or move in a respective direction. The first gear wheel 24 and the column 26 may be formed integrally as one component, e.g. by injection molding. Alternatively, the first gear wheel 24 and the column 26 may be formed separately and then fixed connected together.

The first wheel surface of the first gear wheel is provided with teeth. In this embodiment, the second wheel surface of the first gear wheel is free of any teeth.

The cylindrical part 16 of the upper portion 6 of the food cutter 2 contains a second gear wheel 28. Similar to the first gear wheel 24, the second gear wheel 28 defines a first, or upper, wheel surface 28a and a second, lower, wheel surface 28b. However, unlike the first gear wheel 24, the second gear wheel 28 is, with respect to the longitudinal axis or the first gear wheel 24, horizontally disposed. In other words, the second gear wheel 28 (or its wheel surface) is positioned perpendicularly to the (wheel surface of the) first gear wheel 24. The upper wheel surface 28a of the second gear wheel 28 is provided with teeth to which the teeth from the first wheel surface 24a of the first gear wheel 24 engages. It can thus be envisaged that, in use, rotational movement of the first gear wheel 24 causes corresponding rotational movement of the second gear wheel 28. Please see FIGS. 5a to 5d.

FIG. 4 depicts that the second gear wheel 28 is positioned in an off-centered configuration with respect to the cylindrical part 16. The second gear wheel 28 is provided with a rim in the lower wheel surface 28b defining an opening. Teeth is provided at the rim of the second gear wheel 28. Please also see FIG. 5e.

Figure 5A:
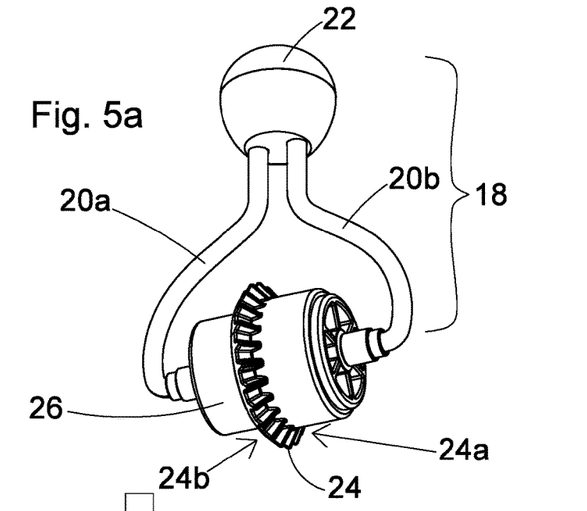
FIG. 5a is a first schematic diagram showing a part of an internal structure of an upper portion of the food cutter of FIG. 1.
Figure 5B:
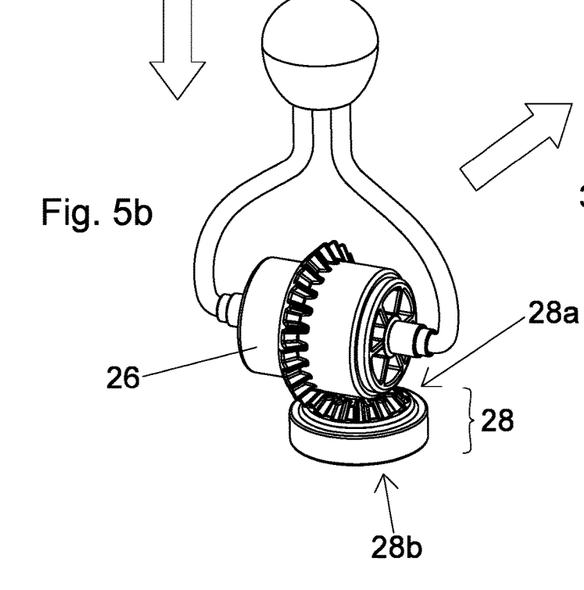
FIG. 5b is a second schematic diagram showing a part of an internal structure of an upper portion of the food cutter of FIG. 1.
Figure 5C:
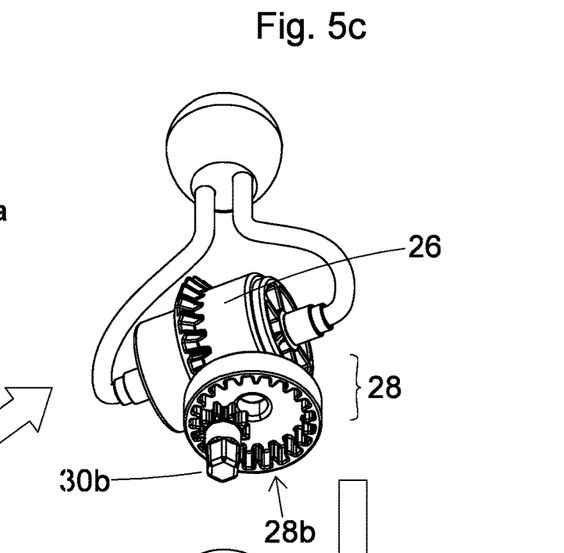
FIG. 5c is a third schematic diagram showing parts of an internal structure of an upper portion of the food cutter of FIG. 1.
Figure 5D:
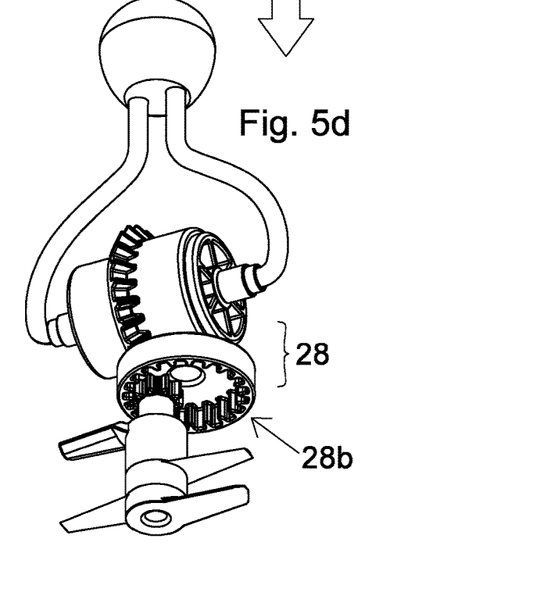
FIG. 5d is a fourth schematic diagram showing parts of an internal structure of an upper portion of the food cutter of FIG. 1.
Figure 5E:
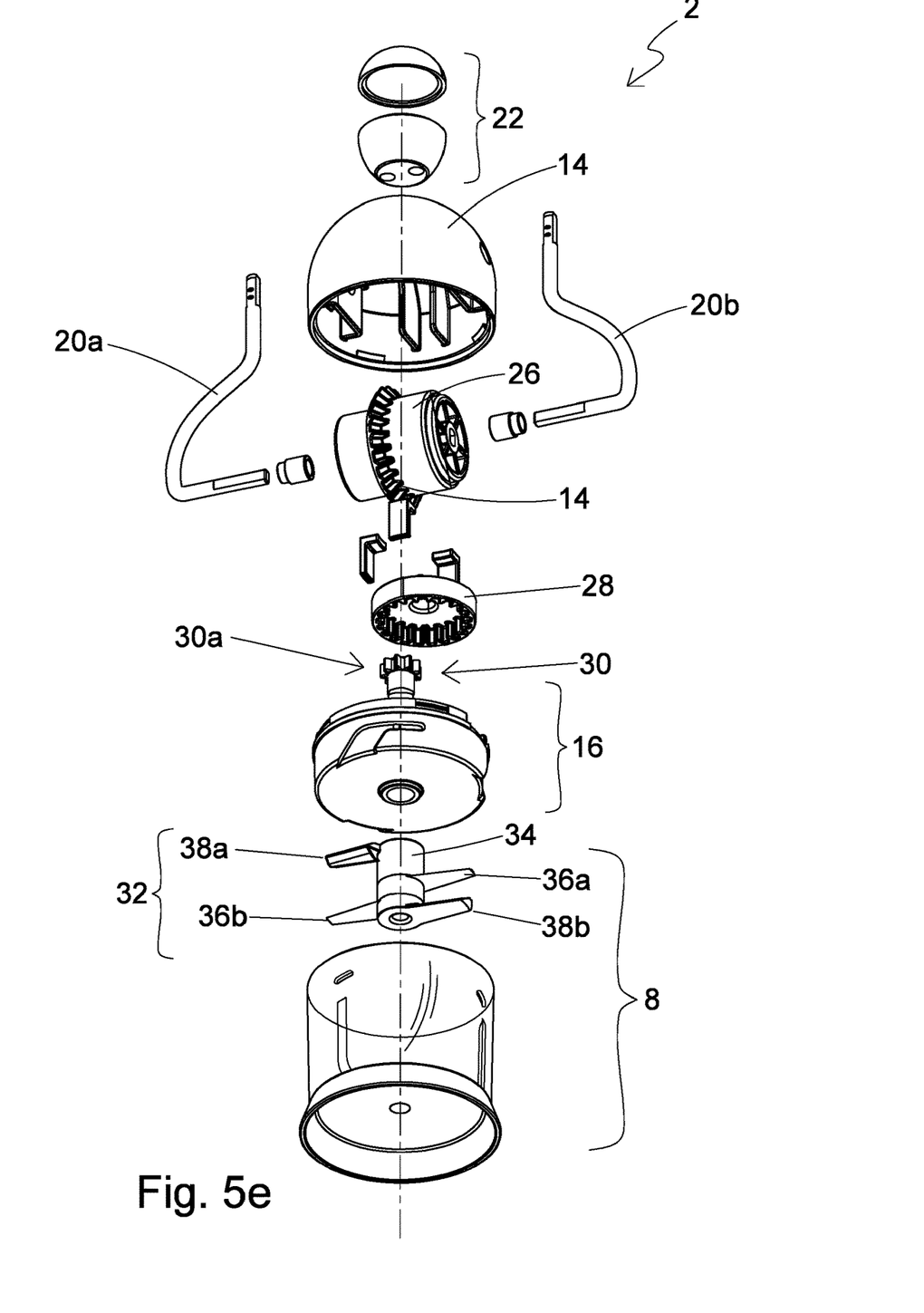
FIG. 5e is a second exploded view of the food cuter of FIG. 1 more comprehensively depicting the internal structure the food cutter.
Figures 6A, 6B, 6C:
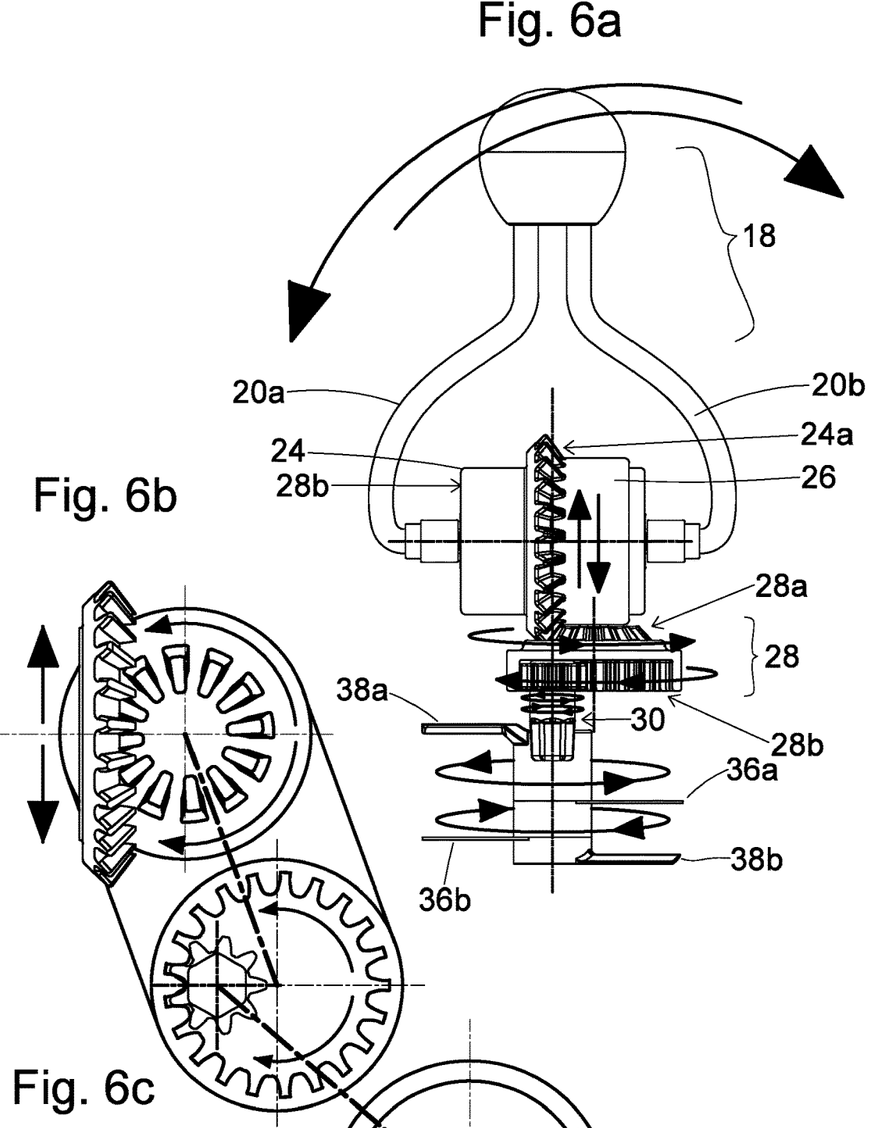
FIGS. 6a, 6b, 6c and 6d are schematic diagrams showing reciprocating movement of the internal structure of the food cutter of FIG. 1. during use.
Figure 6D:
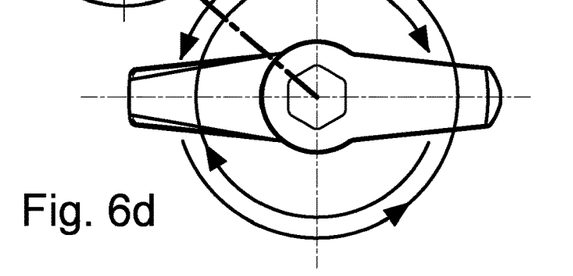

Referring to FIG. 5e, the cylindrical part 16 contains a drive shaft 30 defining an upper end 30a and a lower end 30b. The drive shaft 30 is provided with teeth at the rim of the upper end 30a. The shaft drive 30 is positioned with the teeth thereof engaged to the teeth from the lower surface 28b of the second gear wheel 28. The lower end 30b of the of the drive shaft 30 assumes the configuration of a polygonal column. It can thus be envisaged that, in use, rotational movement of the second gear wheel 28 causes corresponding rotational movement of the drive shaft 30. Please also see FIG. 5c.

Still referring to FIG. 5e, the lower portion 8 of the food cutter 2 is provided with a container generally in the form of a cup defining a cavity for accommodating food items to be processed. The lower portion 8 also includes a blade assembly 32. The blade assembly 32 is provided with an axle 34 in its center and two cutting blades 36a, 36b radially extending from a mid-portion of the axle 34. Each cutting blade 36a or 36b is provided with two cutting edges on opposite ends thereof. The blade assembly 32 is further provided with two scraping members 38a, 38b, namely an upper scraping member and a lower scrapping member. Please also see FIG. 3. The scarping members 38a, 38b are thin plates with tapered opposite ends. The upper scrapping member 38a is positioned adjacent a bottom surface of the upper portion and the lower scrapping member 38b is positioned adjacent a floor surface of the lower portion. It can thus be envisaged that, in use, rotational movement of the drive shaft 30 causes corresponding rotational movement of the blade assembly 32 and thus the cutting blades 36a, 36b. The rotational movement of the drive shaft 30 also causes corresponding rotational movement of the scraping members 38a, 38b such that food items adhered to the bottom surface and the floor surface can be dislodged for processing. In an alternative embodiment, the scraping members 38a, 38b abut the bottom surface and the lower surface, respectively. Please also see FIG. 5d. In other embodiments, the blade assembly may provide three or four cutting blades radially extending from the drive shaft.

Still referring to FIG. 5e, the second gear wheel 28 and the upper end 30a of the drive shaft 30 act as a change gear device. In order for the food cutter to work effectively, there are requirements on the first gear wheel 24, the second gear wheel 28 and the drive shaft 30. Specifically, there are requirements on the ratio of the teeth provided on the first gear wheel 24, the upper surface of the second gear wheel 28, the inner rim of the second gear wheel and the upper end of the drive shaft 30. In this embodiment, the teeth are configured such that, due the number of the respective teeth, the movement ratio between the first gear wheel 24 and the drive shaft 30 is substantially 4. By movement ratio, it refers to the extent of movement caused by the first gear wheel 24 to the drive shaft 30. When movement ratio is 4, it means an extent of rotational movement of the first gear wheel 24 will translate to four times of that rotational movement (and thus rotational speed) to the drive shaft 30. During the course leading to the present invention, experiments were conducted to ascertain a workable range of movement ratio in connection with to the context of the invention. The following table summarizes the experimental results.

TABLE 1

Results of number of teeth on gear wheels and drive shalf

| Example | Number of teeth on first gear wheel 24a | Number of teeth on upper surface of second gear wheel 28a | Number of teeth on inner rim of second gear wheel 28a | Number of teeth on upper end of drive shaft 30a | Rotational movement ratio of first gear wheel and drive shaft | Remarks |
|---|---|---|---|---|---|---|
| 1 | 15 | 12 | 21 | 9 | 2.92 | |
| 2 | 23 | 12 | 21 | 9 | 4.47 | |
| 3 | 30 | 12 | 21 | 9 | 5.83 | |
| 4 | 40 | 12 | 21 | 9 | 7.78 | |

The experiments identified that if the ratio is below 2.92, operating the food cutter would be ineffective. On the other hand, if the ratio is above 7.78, excessive strength from the user would be required, rendering the food cutter unusable by most individuals. In other word, the preferred range of ratio of rotational movement of the first gear wheel and 2.92 to 7.78.

FIGS. 6a, 6b, 6c and 6d are schematic diagrams showing movement of the internal structure of the food cutter 2 of FIG. 1. during use. Similar to FIGS. 5a to 5d, FIGS. 6a to 6d illustrate the transfer of force and movement from the handle 18 of the food cutter 2 to the first gear wheel 24, then to the second gear wheel 28, then to the drive shaft 30, then to the axle 34, then to the blade assembly 32, finally to the cutting blades 36a, 36b.

Figure 7A:
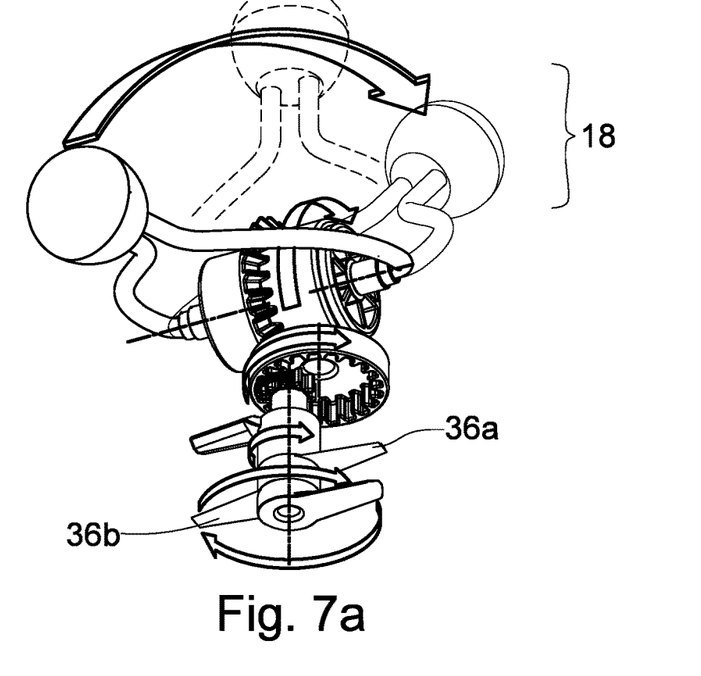
FIGS. 7a and 7b are alternative schematic diagrams showing reciprocating movement of the internal structure of the food cutter of FIG. 1 during use.
Figure 7B:
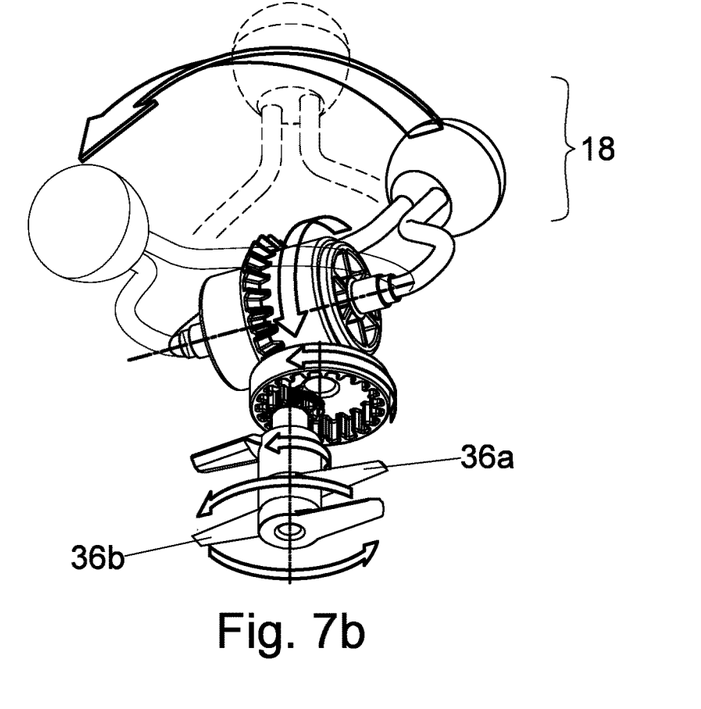

FIGS. 7a and 7b are alternative schematic diagrams showing the transfer of force from the handle 18 to finally the cutting blades 36a, 36b.

At least from FIGS. 6a to 6d and 7a to 7b, it can be understood that as the handle is reciprocatingly swung from one side to the other side of the upper portion, the cutting blades reciprocatingly rotates thus effective cutting or slicing of food items contained in the lower portion. Please also see FIGS. 8, 9a to 9b, and 10a to 10b.

Embodiments of food cutters according the present invention are advantageous in a multi-fold manner. Firstly, the food cutter 2 is provided with only one vertically disposed operable gear wheel. By operable gear wheel, it means it functionally engages and drive a subsequent movable component. In the context of the embodiment as illustrated above, the only vertically disposed operable gear wheel is the first gear wheel 24. This is significant partly because, unlike more complex systems which involve multiple vertically disposed gear wheels, manufacturing of the food cutter with only one vertically disposed gear wheel can be made more cost effective. Further, the provision of one vertically disposed gear wheel allows a relatively simple transfer of force and motion from the handle. Secondly, the food cutter 2 is provided with only one horizontally disposed gear wheel driven by the vertically disposed gear wheel. Then between the horizontally disposed gear wheel and the blade assembly, there is only the drive shaft. The provision of limited number of moving parts allows ease of manufacturing and assembly, ease, efficient, effective and reliable of transfer of force and motion from the handle to the cutting blades. Further, reciprocating movement of the handle of the food cutter entails respective rotational movement of the cutting blades. The rotation in alternating direction or bi-directional rotation of the cutting blades allows the food cutter be made with a more simplified and effective construction.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Further, wording, for example, "upper", "lower", etc., refers to the relatively position; wording such as "vertical", "horizontal", etc. refers to the relatively orientation; etc.

What is claimed is:

1. A food cutter comprising:
an elongate body defining a longitudinal axis, comprising an upper portion and a lower portion, wherein:
the upper portion includes a housing, a handle extended from the housing, a drive shaft, wherein the housing contains a gear mechanism transferring a driving force from the handle to the drive shaft,
the lower portion includes a container for accommodating food items to be processed, and a blade assembly including a plurality of rotatable blades arranged within the container, wherein the lower portion is provided an upper rim defining an opening to which the upper portion removably engages to close the opening during use,
the handle is provided with a pair of arms extending from the upper portion and joining to form a lever at one end thereof, wherein in use the lever of the handle is reciprocatingly movable between a clockwise or upward direction and an anti-clockwise or downward direction,
the gear mechanism has a first gear wheel, vertically disposed, with respect to the longitudinal axis and defining a first wheel surface and a second wheel surface opposite to the first wheel surface,
a rim of the first wheel surface is provided with teeth,
the gear mechanism has a second gear wheel, horizontally disposed, with respect to the longitudinal axis and defining a first, upwardly facing, wheel surface provided with teeth at which the teeth of the first gear wheel engage, and a second, downwardly facing, wheel surface defining an inner rim provided with teeth, the drive shaft has an elongate profile and is vertically disposed and defines an upper end engaged with the teeth of the inner rim of the second wheel surface, and the drive shaft is provided with a lower end for driving the plurality of rotatable blades disposed in the lower portion, whereby clockwise or upward movement of the lever of the handle effects rotation of the blades in one direction and anti-clockwise or downward movement of the lever of the handle effects rotation of the plurality of blades in a direction opposite the one direction.

2. A food cutter as claimed in claim 1, wherein:
the first gear wheel is the only vertically disposed gear wheel in the gear mechanism,
the elongate body has a cylindrical profile with a closed bottom and a top end of the upper portion has a hemispherical profile; and
the lower end of the drive shaft protrudes from the upper portion of the food cutter.

3. A food cutter as claimed in claim 2, wherein the elongate body has a height of 8.8-16.5 cm and a width or diameter of 5.9-12.5 cm.

4. A food cutter as claimed in claim 2, wherein the pair of arms extending from opposite sides of the upper portion of the food cutter defines a laterally extending axis passing through the center of the first gear wheel, and wherein the laterally extending axis is disposed perpendicularly to the longitudinal axis of the elongate body.

5. A food cutter as claimed in claim 4, wherein the pair of arms extending from the upper portion wraps around and conforms to the hemispherical profile as the pair of arms transition into the lever.

6. A food cutter as claimed in claim 5, wherein the lever is reciprocatingly movable or swingable from one lateral side of the upper portion of the food cutter to an opposite lateral side of the upper portion of the food cutter.

7. A food cutter as claimed in claim 1, wherein the first gear wheel is provided with a column fitted to or formed in the center thereof and the pair of arms is fixedly secured to the column whereby movement of the handle and thus the pair of arms rotate the column and thus the first gear wheel.

8. A food cutter as claimed in claim 1, wherein the second wheel surface of the first gear wheel is devoid of operable teeth.

9. A food cutter as claimed in claim 8, wherein the second gear wheel is disposed within the upper portion of the food cutter in an off-centered configuration and positioned such that the teeth of the first wheel surface of the first gear wheel engages the teeth of the first wheel surface of the second gear wheel.

10. A food cutter as claimed in claim 8, wherein the elongate body and the drive shaft share the longitudinal axis.

11. A food cutter as claimed in claim 10, wherein the upper end of the drive shaft is provided with teeth engaged with the teeth of the inner rim of the second gear wheel whereby rotational movement of the second gear wheel in turn rotates the drive shaft.

12. A food cutter as claimed in claim 1, wherein the blade assembly includes an axle from which the plurality of blades radially extends.

13. A food cutter as claimed in claim 12, wherein the lower end of the drive shaft engages with an upper end of the axle whereby rotation of the drive shaft rotates the plurality of blades.

14. A food cutter as claimed in claim 1, wherein the plurality of blades includes two or three blade members.

15. A food cutter as claimed in claim 12, wherein the blade assembly includes a first plate positioned adjacent to or abutting a bottom surface of the upper portion of the food cutter and a second plate positioned adjacent to or abutting the lower portion of the food cutter for dislodging food items adhered to the bottom surface of the upper portion and a floor surface of the lower portion of the food cutter to facilitate processing of the dislodged food items by the plurality of blades.

16. A food cutter comprising:
an elongate body defining a longitudinal axis, comprising an upper portion and a lower portion, wherein:
the elongate body has a cylindrical profile with a closed bottom and a top end of the upper portion has a hemispherical profile, wherein the elongate body has a height of 8.8-16.5 cm and a width or diameter of 5.9-12.5 cm,
the upper portion includes a housing, a handle extending from the housing, a drive shaft, wherein the housing contains a gear mechanism transferring a driving force from the handle to the drive shaft,
the gear mechanism comprises a second gear wheel including a second wheel surface defining an inner rim provided with teeth,
the drive shaft includes an upper end engaged with the teeth of the inner rim,
the lower portion comprises a container for accommodating food items to be processed, and a blade assembly including a plurality of rotatable blades arranged within the container, wherein the lower portion is provided an opening to which the upper portion is removably engaged to close the opening during use,
the handle extends from the elongate body and in use is reciprocatingly movable in a clockwise or upward direction and in an anti-clockwise or downward direction, and
the drive shaft is provided with a lower end protruding from the upper portion for driving a plurality of rotatable blades disposed in the lower portion of the food cutter, wherein clockwise or upward movement of the handle effects rotation of the plurality of blades in one direction and anti-clockwise or downward movement of the handle effects rotation of the plurality of blades in a direction opposite the one direction.

17. A food cutter as claimed in claim 16, wherein:
the gear mechanism has a first gear wheel, with respect to the longitudinal axis, vertically disposed, defining a first wheel surface,
the first gear wheel defines a second wheel surface opposite to the first wheel surface,
the first gear wheel is the only vertically disposed gear wheel in the gear mechanism,
a rim of the first wheel surface is provided with teeth,
the second gear wheel is horizontally disposed, with respect to the longitudinal axis, and defines a first, upwardly facing, wheel surface provided with teeth that engage the teeth of the first gear wheel, and the second wheel surface of the second gear wheel is a downwardly facing wheel surface, and
the drive shaft has an elongate profile and is vertically disposed.

18. A food cutter as claimed in claim 17, wherein the handle is provided with a pair of arms extending from opposite sides of the upper portion and joining to form a lever at one end thereof, and wherein in use the lever of the handle is reciprocatingly movable in the clockwise or upward direction and in the anti-clockwise or downward direction.

19. A food cutter as claimed in claim 18, wherein the second wheel surface of the first gear wheel is free devoid of operable teeth.

20. A food cutter as claimed in claim 19, wherein the blade assembly includes a first plate disposed adjacent to a bottom surface of the upper portion and a second plate disposed adjacent to a floor surface of the lower portion for dislodging food items adhered to the bottom surface of the upper portion and the floor surface of lower portion.

\* \* \* \* \*